US012613934B2

(12) United States Patent (10) Patent No.: US 12,613,934 B2
Yang (45) Date of Patent: Apr. 28, 2026

(54) ELAPSED TIME OPTIMIZATION METHOD AND APPARATUS FOR PAGE REFRESHING, AND TERMINAL DEVICE

(71) Applicant: Beijing Bytedance Network Technology Co., Ltd., Beijing (CN)

(72) Inventor: Jie Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/697,433

(22) PCT Filed: Sep. 26, 2022

(86) PCT No.: PCT/CN2022/121250
§ 371 (c)(1),
(2) Date: Mar. 29, 2024

(87) PCT Pub. No.: WO2023/051439
PCT Pub. Date: Apr. 6, 2023

(65) Prior Publication Data
US 2025/0053606 A1 Feb. 13, 2025

(30) Foreign Application Priority Data
Sep. 30, 2021 (CN) .......................... 202111165856.0

(51) Int. Cl.
*G06F 1/30* (2006.01)
*G06F 1/28* (2006.01)
(Continued)

(52) U.S. Cl.
CPC ............ *G06F 16/957* (2019.01); *G06F 9/445* (2013.01)

(58) Field of Classification Search
CPC ......... G06F 16/957; G06F 9/445; G06F 12/00
(Continued)

(56) References Cited

U.S. PATENT DOCUMENTS 6,564,332 B1 * 5/2003 Nguyen ................ G06F 1/3287
713/340
11,621,029 B2 * 4/2023 Akel ..................... G11C 11/408
365/222
(Continued)

FOREIGN PATENT DOCUMENTS

CN        103488735 A        1/2014
CN        105701113 A        6/2016
(Continued)

OTHER PUBLICATIONS

International Search Report and Written Opinion received for PCT/CN2022/121250, mailed Dec. 20, 2022, 14 pages.
(Continued)

*Primary Examiner* — Jude Jean Gilles
(74) *Attorney, Agent, or Firm* — Astute IP Law Group

(57) ABSTRACT

The present invention relates to the technical field of terminals, and relates to a time-consuming optimization method and apparatus for page refreshing, and a terminal device. The method comprises: obtaining target time-consuming information of a target stage in the process of refreshing a first page; when the target time-consuming information does not meet a time-consuming limiting condition corresponding to the target stage, determining that the target stage is to be optimized; and during the subsequent refreshing of the first page, performing optimization processing on the target stage. The present invention is used for solving the problem of long consumed time for refreshing a page.

16 Claims, 4 Drawing Sheets

(51) Int. Cl.
 *G06F 9/445*   (2018.01)
 *G06F 16/957*  (2019.01)
(58) Field of Classification Search
 USPC ........................................................ 709/203
 See application file for complete search history.

(56)     References Cited

U.S. PATENT DOCUMENTS

| | | |
|---|---|---|
| 2019/0066163 A1 | 2/2019 | Rubinstein et al. |
| 2020/0050396 A1* | 2/2020 | Keil .................... G06F 13/1621 |

FOREIGN PATENT DOCUMENTS

| | | |
|---|---|---|
| CN | 107391518 A | 11/2017 |
| CN | 107861783 A | 3/2018 |
| CN | 109739749 A | 5/2019 |
| CN | 110858238 A | 3/2020 |
| CN | 111475750 A | 7/2020 |
| CN | 111552613 A | 8/2020 |
| CN | 113190321 A | 7/2021 |

OTHER PUBLICATIONS

Office Action for Chinese Patent Application No. 202111165856.0, mailed on Jun. 6, 2025, 17 pages.
Zhu et al., "Page switching speed up by 30% JD Mall APP first screen time-consuming monitoring and optimization practice", JD Retail Technology, Dec. 9, 2020, 32 pages.
Kisnows, "Five minutes to access streaming rendering", Blog of Mo Qiao, Mar. 23, 2021, 18 pages.
Office Action for Chinese Patent Application No. 202111165856.0, mailed on Nov. 10, 2025, 16 pages.

\* cited by examiner

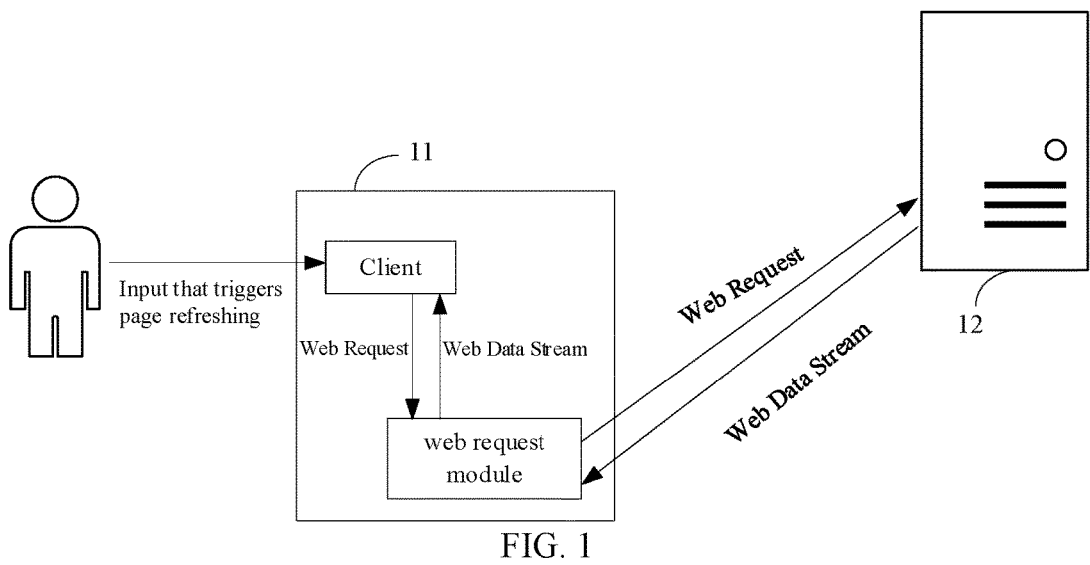

FIG. 1

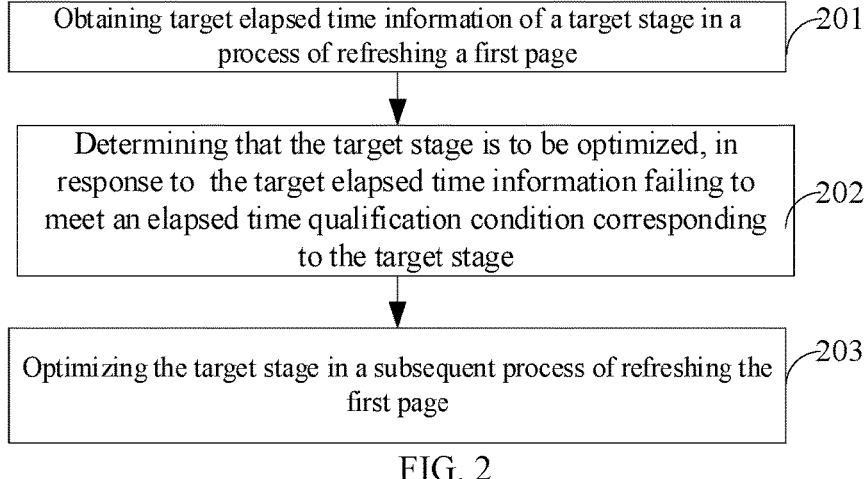

Obtaining target elapsed time information of a target stage in a process of refreshing a first page — 201

Determining that the target stage is to be optimized, in response to the target elapsed time information failing to meet an elapsed time qualification condition corresponding to the target stage — 202

Optimizing the target stage in a subsequent process of refreshing the first page — 203

FIG. 2

Process of Refreshing the First Page

| Input that triggers page refreshing | → | Loading view information corresponding to view fragment | → | Initiating web request | → | Loading view information corresponding to web data stream | → | Loading view | a b

ELAPSED TIME OPTIMIZATION METHOD AND APPARATUS FOR PAGE REFRESHING, AND TERMINAL DEVICE

CROSS-REFERENCE TO RELATED APPLICATION

This is a national stage application based on International Patent Application No. PCT/CN2022/121250, filed Sep. 26, 2022, which claims priority to Chinese Patent Application No. 202111165856.0, filed on Sep. 30, 2021, with the invention name of "ELAPSED TIME OPTIMIZATION METHOD AND APPARATUS FOR PAGE REFRESHING, AND TERMINAL DEVICE", the disclosures of which are incorporated herein by reference in their entireties.

TECHNICAL FIELD

The present disclosure relates to the technical field of terminals and in particular to an elapsed time optimization method and apparatus for page refreshing and a terminal device.

BACKGROUND

At present, when refreshing a page on a terminal device, in terms of some complicated pages, it takes a long time (usually seconds) to display the loaded pages. However, if it takes a long time to refresh the page, the user experience will be reduced. Therefore, locating the time-consuming points in the process of refreshing the page, and performing targeted optimization is an urgent problem to be solved.

SUMMARY

In order to solve the above technical problem or at least partially solve the above technical problem, the present disclosure provides an elapsed time optimization method and apparatus for page refreshing and a terminal device, which can identify a target stage that is time-consuming in the process of refreshing a page and optimize the target stage in a targeted manner to reduce the elapsed time duration for refreshing the page.

In order to achieve the above objectives, the technical solutions provided by the embodiments of the present disclosure are as follows.

In the first aspect, at least one embodiment provides an elapsed time optimization method for page refreshing, the method comprises:

obtaining target elapsed time information of a target stage in a process of refreshing a first page;

determining that the target stage is to be optimized, in response to the target elapsed time information failing to meet an elapsed time qualification condition corresponding to the target stage; and optimizing the target stage in a subsequent process of refreshing the first page.

As an optional implementation of the embodiments of the present disclosure, the process of refreshing the first page comprises a plurality of stages, and the target stage is at least one of the plurality of stages.

As an optional implementation of the embodiments of the present disclosure, the target stage comprises at least one of the following stages:

a first request stage, a second request stage, a receiving stage, a parsing stage and a page rendering stage, in which the first request stage is from receiving an input that triggers refreshing the first page to a client initiating a web request; the second request stage is from the client initiating the web request to a web request module initiating the web request; the receiving stage is from the client initiating the web request to receiving a web data stream; the parsing stage is from receiving the web data stream to completing parsing of the web data stream; the page rendering stage is from completing parsing of the web data stream to completing page rendering.

As an optional implementation of the embodiments of the present disclosure, the target stage is the first request stage, the target elapsed time information comprises at least one of the following:

a first elapsed time duration;

a view layer in which a first view fragment initiating the web request is located; and a loading mode of view information corresponding to a view fragment, the loading mode comprising: preloading or not preloading;

the target elapsed time information failing to meet the elapsed time qualification condition corresponding to the target stage, comprises at least one of the following:

the first elapsed time duration being greater than or equal to a first preset duration;

the view layer in which the first view fragment is located not being an outermost layer; and the loading mode of the view information corresponding to the view fragment being not preloading.

As an optional implementation of the embodiments of the present disclosure, the target stage is the second request stage, the target elapsed time information comprises at least one of the following:

a second elapsed time duration; and an initialization state of the web request module, the initialization state comprising: a state that initialization has been performed before the second request stage, or, a state that initialization has not been performed before the second request stage;

the target elapsed time information failing to meet the elapsed time qualification condition corresponding to the target stage, comprises at least one of the following:

the second elapsed time duration being greater than or equal to a second preset duration; and the initialization state of the web request module being that initialization has not been performed before the second request stage.

As an optional implementation of the embodiments of the present disclosure, the target stage is the receiving stage, the target elapsed time information comprises at least one of the following:

a third elapsed time duration; and a first interface elapsed time duration, the first interface elapsed time duration being determined according to the third elapsed time duration and a second interface elapsed time duration obtained from a server, the second interface elapsed time duration being a time duration from the server receiving the web request to the server sending the web data stream corresponding to the web request;

the target elapsed time information failing to meet the elapsed time qualification condition corresponding to the target stage, comprises at least one of the following:

the third elapsed time duration being greater than or equal to a third preset duration;

the first interface elapsed time duration being greater than or equal to a preset interface elapsed time duration.

As an optional implementation of the embodiments of the present disclosure, the target stage is the parsing stage, the target elapsed time information comprises at least one of the following:

a fourth elapsed time duration; and a loading mode of the web data stream, the loading mode comprising: loading after parsing is completed, or loading while parsing;

the target elapsed time information failing to meet the elapsed time qualification condition corresponding to the target stage, comprises at least one of the following:

the fourth elapsed time duration being greater than or equal to a fourth preset duration; and the loading mode of the web data stream is loading while parsing.

As an optional implementation of the embodiments of the present disclosure, the target stage is the page rendering stage, the target elapsed time information comprises at least one of the following:

a fifth elapsed time duration; and a loading mode of view information corresponding to the web data stream, the loading mode comprising: preloading or not preloading;

the target elapsed time information failing to meet the elapsed time qualification condition corresponding to the target stage, comprises at least one of the following:

the fifth elapsed time duration being greater than or equal to a fifth preset duration; and the loading mode of the view information corresponding to the web data stream being not preloading.

As an optional implementation of the embodiments of the present disclosure, the target stage comprises: the first request stage and/or the page rendering stage;

the optimizing the target stage comprises: performing at least two of the following in parallel when refreshing the first page:

preloading view information corresponding to a view fragment;

initiating the web request; and preloading view information corresponding to the web data stream.

As an optional implementation of the embodiments of the present disclosure, the target stage comprises: the second request stage and/or the receiving stage;

the optimizing the target stage comprises:

sending the web request after deleting a target interface field in a data interface in the web request, wherein the target interface field is a discarded interface field.

As an optional implementation of the embodiments of the present disclosure, the target stage comprises: the second request stage;

the optimizing the target stage comprises:

initializing the web request module before the second request stage.

As an optional implementation of the embodiments of the present disclosure, the target stage comprises: the receiving stage;

the optimizing the target stage comprises:

configuring request interfaces corresponding to a plurality of web requests to execute in parallel.

As an optional implementation of the embodiments of the present disclosure, the target stage comprises: the parsing stage;

the optimizing the target stage comprises:

loading view information corresponding to the web data stream in a process of parsing the web data stream through a mode of loading while parsing.

As an optional implementation of the embodiments of the present disclosure, the loading the view information corresponding to the web data stream in the process of parsing the web data stream through the mode of loading while parsing comprises:

in the process of parsing the web data stream, after parsing the web data stream to obtain first screen data, loading view information corresponding to the first screen data, and synchronously parsing first remaining data in the web data stream, wherein the first screen data is data displayed in a screen for a first time in data of the first page;

or, in the process of parsing the web data stream, after parsing the web data stream to obtain placeholder data, loading placeholder view information corresponding to the placeholder data, and synchronously parsing second remaining data in the web data stream, wherein the placeholder data is a view frame used for displaying an element in a view in the first screen data.

In the second aspect, at least one embodiment of the present disclosure provides an elapsed time optimization apparatus for page refreshing, the elapsed time optimization apparatus for page refreshing comprises:

an obtaining module, configured to obtain target elapsed time information of a target stage in a process of refreshing a first page;

a determining module, configured to determine that the target stage is to be optimized, in response to the target elapsed time information failing to meet an elapsed time qualification condition corresponding to the target stage; and an optimizing module, configured to optimize the target stage in a subsequent process of refreshing the first page.

As an optional implementation of the embodiments of the present disclosure, the target stage comprises at least one of the following stages:

a first request stage, a second request stage, a receiving stage, a parsing stage and a page rendering stage, in which the first request stage is from receiving an input that triggers refreshing the first page to a client initiating a web request; the second request stage is from the client initiating the web request to a web request module initiating the web request; the receiving stage is from the client initiating the web request to receiving a web data stream; the parsing stage is from receiving the web data stream to completing parsing of the web data stream; the page rendering stage is from completing parsing of the web data stream to completing page rendering.

As an optional implementation of the embodiments of the present disclosure, the target stage is the first request stage, the target elapsed time information comprises at least one of the following:

a first elapsed time duration;

a view layer in which a first view fragment initiating the web request is located;

and a loading mode of view information corresponding to a view fragment, the loading mode comprising: preloading or not preloading;

the target elapsed time information failing to meet the elapsed time qualification condition corresponding to the target stage, comprises at least one of the following:
the first elapsed time duration being greater than or equal to a first preset duration;
the view layer in which the first view fragment is located not being an outermost layer; and
the loading mode of the view information corresponding to the view fragment being not preloading.

As an optional implementation of the embodiments of the present disclosure, the target stage is the second request stage,
the target elapsed time information comprises at least one of the following:
a second elapsed time duration; and
an initialization state of the web request module, the initialization state comprising: a state that initialization has been performed before the second request stage, or, a state that initialization has not been performed before the second request stage;
the target elapsed time information failing to meet the elapsed time qualification condition corresponding to the target stage, comprises at least one of the following:
the second elapsed time duration being greater than or equal to a second preset duration; and
the initialization state of the web request module being that initialization has not been performed before the second request stage.

As an optional implementation of the embodiments of the present disclosure, the target stage is the receiving stage,
the target elapsed time information comprises at least one of the following:
a third elapsed time duration; and
a first interface elapsed time duration, the first interface elapsed time duration being determined according to the third elapsed time duration and a second interface elapsed time duration obtained from a server, the second interface elapsed time duration being a time duration from the server receiving the web request to the server sending the web data stream corresponding to the web request;
the target elapsed time information failing to meet the elapsed time qualification condition corresponding to the target stage, comprises at least one of the following:
the third elapsed time duration being greater than or equal to a third preset duration;
the first interface elapsed time duration being greater than or equal to a preset interface elapsed time duration.

As an optional implementation of the embodiments of the present disclosure, the target stage is the parsing stage,
the target elapsed time information comprises at least one of the following:
a fourth elapsed time duration; and
a loading mode of the web data stream, the loading mode comprising: loading after parsing is completed, or loading while parsing;
the target elapsed time information failing to meet the elapsed time qualification condition corresponding to the target stage, comprises at least one of the following:
the fourth elapsed time duration being greater than or equal to a fourth preset duration; and
the loading mode of the web data stream is loading while parsing.

As an optional implementation of the embodiments of the present disclosure, the target stage is the page rendering stage, the target elapsed time information comprises at least one of the following:
a fifth elapsed time duration; and
a loading mode of view information corresponding to the web data stream, the loading mode comprising: preloading or not preloading;
the target elapsed time information failing to meet the elapsed time qualification condition corresponding to the target stage, comprises at least one of the following:
the fifth elapsed time duration being greater than or equal to a fifth preset duration; and
the loading mode of the view information corresponding to the web data stream being not preloading.

As an optional implementation of the embodiments of the present disclosure, the target stage comprises: the first request stage and/or the page rendering stage;
the optimizing the target stage comprises: performing at least two of the following in parallel when refreshing the first page:
preloading view information corresponding to a view fragment;
initiating the web request; and
preloading view information corresponding to the web data stream.

As an optional implementation of the embodiments of the present disclosure, the target stage comprises: the second request stage and/or the receiving stage;
the optimizing the target stage comprises:
sending the web request after deleting a target interface field in a data interface in the web request, wherein the target interface field is a discarded interface field.

As an optional implementation of the embodiments of the present disclosure, the target stage comprises: the second request stage;
an optimizing module is specifically configured to initialize the web request module before the second request stage.

As an optional implementation of the embodiments of the present disclosure, the target stage includes: the receiving stage;
the optimizing module is specifically configured to configure request interfaces corresponding to a plurality of web requests to execute in parallel.

As an optional implementation of the embodiment of the present disclosure, the target stage includes: the parsing stage;
the optimizing module is specifically configured to load view information corresponding to the web data stream in a process of parsing the web data stream through a mode of loading the view information while parsing the view information.

As an optional implementation of the embodiment of the present disclosure, the optimizing module 903 is specifically configured to:
through a mode of loading while parsing, in the process of parsing the web data stream, after parsing the web data stream to obtain first screen data, load the view information corresponding to the first screen data, and synchronously parse first remaining data in the web data stream, in which the first screen data is data displayed in a screen for a first time in data of the first page;
or,
in the process of parsing the web data stream, after parsing the web data stream to obtain placeholder data, load placeholder view information corresponding to the placeholder data, and synchronously parse second remaining data in the web data stream, in which the placeholder data is a view frame used for displaying an element in a view in the first screen data.

In the third aspect, at least one embodiment of the present disclosure further provides a terminal device, which includes: a processor, a memory, and a computer program stored in the memory and executable on the processor. The computer program, when executed by the processor, realizes any one of the elapsed time optimization methods for page refreshing according to the above-mentioned the first aspect or the optional implementations thereof.

In the fourth aspect, at least one embodiment of the present disclosure further provides a computer-readable storage medium, a computer program is stored on the computer-readable storage medium, and the computer program, when executed by a processor, realizes any one of the elapsed time optimization methods for page refreshing according to the above-mentioned the first aspect or the optional implementations.

In the fifth aspect, at least one embodiment of the present disclosure further provides a computer program product, the computer program product, when run on a computer, causes the computer to realize any one of the elapsed time optimization methods for page refreshing according to the above-mentioned the first aspect or the optional implementations thereof.

At least one embodiment provides an elapsed time optimization method for page refreshing, the method comprises: obtaining target elapsed time information of a target stage in a process of refreshing a first page; determining that the target stage is to be optimized, in response to the target elapsed time information failing to meet an elapsed time qualification condition corresponding to the target stage; and optimizing the target stage in a subsequent process of refreshing the first page. By obtaining the target elapsed time information of the target stage in the process of refreshing the first page, it can be judged whether the target elapsed time information meets the elapsed time qualification condition. When it is determined that the target elapsed time information meets the elapsed time qualification condition corresponding to the target stage, it is considered that there is no problem of excessive time consumption in this stage; and when it is determined that the target elapsed time information fails to meet the elapsed time qualification condition corresponding to the target stage, it is considered that there is the problem of excessive time consumption in the target stage and the target stage needs to be optimized. In this way, the target stage that is too time-consuming can be located in the process of refreshing the page, and in the subsequent process of refreshing the first page, targeted optimization can be performed on the target stage.

BRIEF DESCRIPTION OF DRAWINGS

The accompanying drawings, which are incorporated into and form a part of the specification, illustrate embodiments consistent with the present disclosure and are used in conjunction with the specification to explain the principles of the present disclosure.

In order to more clearly illustrate the technical solutions in the embodiments of the present disclosure or the prior art, the accompanying drawings to be used in the description of the embodiments or prior art will be briefly described below. Obviously, for those skilled in the art, other accompanying drawings can be obtained based on these accompanying drawings without creative effort.

FIG. 1 is a schematic diagram of an application scenario of page refreshing provided by an embodiment of the present disclosure;

FIG. 2 is a flowchart of an elapsed time optimization method for page refreshing provided by an embodiment of the present disclosure;

FIG. 3 is a schematic diagram of a division of a process of refreshing a first page provided by an embodiment of the present disclosure;

DETAILED DESCRIPTION

Figure 4:
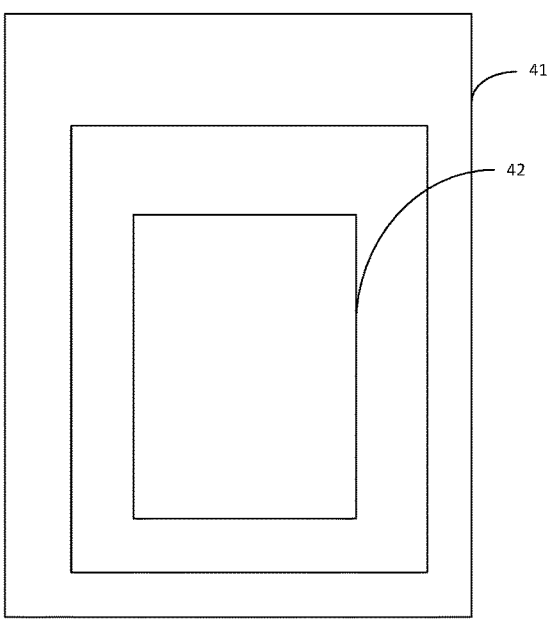
FIG. 4 is a schematic diagram of multi-layer nesting of view fragments provided by an embodiment of the present disclosure.

To provide a clearer understanding of the objectives, features, and advantages of the embodiments of the present disclosure, the solutions in the embodiments of the present disclosure will be further described below. It should be noted that the embodiments in the present disclosure and features in the embodiments may be combined with one another without conflict.

Many specific details are described below to help fully understand the embodiments of the present disclosure. However, the embodiments of the present disclosure may also be implemented in other manners different from those described herein. Apparently, the described embodiments in the specification are merely some rather than all of the embodiments of the present disclosure.

At present, when refreshing a page on a terminal device, in terms of some complicated pages, it takes a long time (usually seconds) to display the loaded pages. However, if it takes a long time to refresh the page, the user experience will be reduced. Therefore, locating the time-consuming points in the process of refreshing the page, and performing targeted optimization is an urgent problem to be solved.

FIG. 1 is a schematic diagram of an application scenario of page refreshing provided by an embodiment of the present disclosure. In the Android page refreshing process, a terminal device 11 and a server 12 are usually involved. Generally, after the terminal device 11 receives an input that triggers page refreshing in a client, the client initiates corresponding web requests to a web request module (also referred to as an underlying library, or an Android web request framework) in the Android application layer. The web request module in the Android application layer will first forward these web requests to the server 12. After receiving these web requests, the server 12 will return corresponding web data streams to the web request module in the Android application layer, and the web request module will then return these web data streams to the client. The above-mentioned web request module is also called an underlying library, or an Android web request framework. The scenario shown in FIG. 1 is only an exemplary illustration, and more devices may be involved in the actual application scenario.

It should be noted that the page refreshing process involved in embodiments of the present invention refers to a process that would involve requesting data from the web, rendering a page and displaying the page. The page refreshing can be partial refreshing for the page or global refreshing for the page, as long as the refreshing process involves the processes of requesting data from the web, rendering a page and displaying the page.

Optionally, the page refreshing involved in the embodiments of the present disclosure can refer to a process of displaying a page for the first time after running an application. For example, in the process of running a certain short video application, when the user switches to a recommended short video page for the first time through a click operation, it will involve refreshing the recommended short video page.

Optionally, in terms of the elapsed time optimization method for page refreshing provided by the embodiment of the present disclosure, the execution subject may be an elapsed time optimization apparatus for page refreshing or a terminal device. The elapsed time optimization apparatus for page refreshing may be a functional module or functional entity in the terminal device. The terminal device may be a mobile phone, a tablet computer, a laptop computer, a handheld computer, a vehicle-mounted terminal, a wearable device, an ultra-mobile personal computer (UMPC), a net-book, a personal digital assistant (PDA), a personal computer (PC), etc., without being specifically limited in the embodiment of the present disclosure.

The terminal device in the embodiment of the present disclosure is a terminal device with an operating system. The operating system may be an Android operating system, an iOS operating system, or other possible operating systems, without being specifically limited in the embodiment of the present disclosure.

As shown in FIG. 2 which is a flowchart of an elapsed time optimization method for page refreshing provided by an embodiment of the present disclosure, the method includes the following steps:

201: Obtaining target elapsed time information of a target stage in a process of refreshing a first page.

In the embodiment of the present disclosure, the process of refreshing the first page is divided into a plurality of stages, and the target stage may be at least one of the plurality of stages. The specific number of divided stages can be determined according to actual situations, which is not limited in the embodiment of the present disclosure.

In the embodiment of the present disclosure, the target elapsed time information of the target stage in the process of refreshing the first page can be obtained by means of data burial.

Illustratively, as shown in FIG. 3, which is a schematic diagram of a division of a process of refreshing a first page provided by an embodiment of the present disclosure, the process is divided into the following five stages (A), (B), (C), (D) and (E), and the target stage can include at least one of these five stages:

(A) First Request Stage;

The first request stage is from receiving an input that triggers refreshing the first page to a client initiating a web request; in the first request stage, the start time of data burial is the time when the input that triggers refreshing the first page is received, and the end time of data burial is the time when the client initiates the web request or a time after the client initiates the web request.

The input that triggers refreshing the first page may be a touch input of a user. For example, it may be a click input or a slide input, etc.

The client may be a certain application program in the terminal device, and the application program is not limited in the present disclosure. It can refer to a system application or a third-party application, and as long as the application involves page refreshing, it is within the protection scope of the present disclosure.

(B) Second Request Stage;

The second request stage is from the client initiating the web request to a web request module initiating the web request; in the second request stage, the start time of data burial is the time when the client initiates the web request, and the end time of data burial is the time when the web request module initiates the web request or a time after the web request module initiates the web request.

The web request module is a class library that encapsulates the related functions of web requests, and provides an application programming interface (API) to the external. API is a calling interface left by the operating system for the application program, and the application program makes the operating system execute commands of the application program by calling the API of the operating system.

(C) Receiving Stage;

The receiving stage is from the client initiating the web request to receiving a web data stream; in this stage, the start time of data burial is the time when the client initiates the web request, and the end time of data burial is the time when the client receives the web data stream or a time after the client receives the web data stream.

In the process of web communication, data needs to be transmitted. There are two commonly used data formats: JSON (JavaScript Object Notation) format and XML (Extensible Markup Language) format. "JS" is a lightweight, interpretive or instantly compiled programming language with function priority, and JSON is a lightweight data exchange format, which is easy for humans to read and write, and easy for machines to parse and generate. Generally, in the parsing process of the web data stream, mainly JOSN data parsing and XML data parsing are adopted. The process of JOSN data parsing is as follows: first, a JSON file is created; then, a header file is included in the class; next, the path of the JSON file is obtained, and JSON data is parsed; and finally different types of data values are obtained. The process of XML data parsing is as follows: first, an XML file is created; then, a header file is included in the class and the named file is used; next, the full path of the XML file is obtained, and the XML file is loaded; and finally the elements are obtained and parsed.

(D) Parsing Stage;

The parsing stage is from receiving the web data stream to completing the parsing of the web data stream; in this stage, the start time of data burial is the time when the client receives the web data stream, and the end time of data burial is the time when the parsing of the web data stream is completed, or the end time of data burial is a time after the parsing of the web data stream is completed.

(E) Page Rendering Stage.

The page rendering stage is from completing the parsing of the web data stream to completing page rendering; in this stage, the start time of data burial is the time when the parsing of the web data stream is completed, and the end time of data burial is the time when the page rendering is completed.

Optionally, the View.post ( ) operation is some delay operations after the page rendering is completed, e.g., to get the width and height of the view in the page. Because the View.post ( ) operation is usually executed after the page rendering is completed (that is, the view in the page is loaded), the end time of data burial in this stage may be placed within the View.post ( ) operation.

When parsing the web data stream, syntactic parsing may be performed on the loaded resources; then a rendering tree may be constructed by using the corresponding internal data structure, and position calculation, style calculation, etc., may be performed on each element; and then the page is rendered according to the constructed rendering tree, which can also be interpreted as drawing the elements in the page according to the constructed rendering tree.

Illustratively, performing the syntactic parsing on the loaded resources may be performing syntactic analysis on a computer language in a file format such as XML, etc.

202: Determining that the target stage is to be optimized, in response to the target elapsed time information failing to meet an elapsed time qualification condition corresponding to the target stage.

In the embodiment of the present disclosure, the target elapsed time information can be used to evaluate whether there is a problem of excessive time consumption in the target stage.

For different stages among the above five stages, the contents of the target elapsed time information are different, and the elapsed time qualification conditions set for different stages are also different. The target elapsed time information and the situations in which the target elapsed time information fails to meet the elapsed time qualification condition corresponding to the target stage, are respectively described below according to different stages.

For the target stage being (A) First Request Stage, the target elapsed time information includes the following cases:

(a1) A first elapsed time duration of the first request stage;

(a2) A view layer in which a first view fragment initiating the web request is located;

Usually, the view of a page is formed of multiple view fragments, and there may be multi-layer nesting of the multiple view fragments. As shown in FIG. 4, which is a schematic diagram of multi-layer nesting of the view fragments provided by an embodiment of the present disclosure, there are three view fragments in the presence of multi-layer nesting in FIG. 4, where the fragment identified by 41 is at the outermost layer of the view layers and the fragment identified by 42 is at the innermost layer of the view layers.

In the case where the view layer, in which the fragment (i.e., the first view fragment) initiating the web request is located, is at the inner layer of the view layers, for example, the fragment initiating the web request is the fragment identified by 42, because the order of loading the fragments starts from the outermost layer, it will cause the web request to be initiated late. The web request will not be initiated until the fragment at the outer layer is loaded, which may increase the elapsed time of the first request stage.

(a3) A loading mode of the view information corresponding to a view fragment, the loading mode including: preloading or not preloading;

The loading mode of loading the view information corresponding to the fragment may be preloading or not preloading. In the case of not preloading, it will take some time to load the view information in the first request stage, which may increase the elapsed time of the first request stage.

The view information may be an XML file.

(a4) The first elapsed time duration, and the view layer in which the first view fragment initiating the web request is located;

(a5) The first elapsed time duration, and the loading mode of the view information corresponding to the view fragment;

(a6) The view layer in which the first view fragment initiating the web request is located, and the loading mode of the view information corresponding to the view fragment;

(a7) The first elapsed time duration, the view layer in which the first view fragment initiating the web request is located, and the loading mode of the view information corresponding to the view fragment.

Accordingly, for the case where the target stage is the First Request Stage (A), the situation where the target elapsed time information fails to meet the elapsed time qualification condition corresponding to the target stage, includes at least one of the following situations:

(A1) The first elapsed time duration is greater than or equal to a first preset duration;

Accordingly, the elapsed time qualification condition in this situation may be that the elapsed time duration of the first request stage is less than the first preset duration.

The first preset duration may be set according to actual application situations, such as service types, etc., without being limited in the embodiment of the present disclosure.

(A2) The view layer in which the first view fragment initiating the web request is located is not the outermost layer;

Accordingly, the elapsed time qualification condition in this situation may be that in the first request stage, the web request is initiated at the outermost layer of the view layers.

(A3) The loading mode of the view information corresponding to the view fragment is not preloading.

Accordingly, the elapsed time qualification condition in this situation may be that in the first request stage, the loading mode of the view information corresponding to the view fragment is preloading.

The situation where the target elapsed time information fails to meet the elapsed time qualification condition corresponding to the first request stage may include one or more of the above situations. Specific cases of the target elapsed time information failing to meet the elapsed time qualification condition corresponding to the first request stage are in correspondence with the above cases of the target elapsed time information.

For the case where that the target stage is the Second Request Stage (B), the target elapsed time information includes the following cases:

(b1) A second elapsed time duration of the second request stage;

(b2) An initialization state of the web request module.

The initialization state includes the case that initialization has been performed before the second request stage, or initialization has not been performed before the second request stage.

Accordingly, the case where the target elapsed time information fails to meet the elapsed time qualification condition corresponding to the target stage, includes at least one of the following situations:

(B1) The second elapsed time duration is greater than or equal to a second preset duration;

In this situation, the elapsed time qualification condition may be that the elapsed time duration of the second request stage is less than the second preset duration.

Illustratively, the second preset duration may be 80 ms, 90 ms, 100 ms, etc., and the second preset duration may be set according to actual application situations, such as service types, etc., without being limited in the embodiment of the present disclosure.

(B2) The initialization state of the web request module is that initialization has not been performed before the second request stage.

In this case, the elapsed time qualification condition may be: in the second request stage, the initialization state of the web request module is that initialization has been performed before the second request stage.

In the second request stage, before the web request module sends the web request, the web request module needs to be initialized. Therefore, in the case where initialization has not been performed on the web request module before the second request stage, the web request module needs to be initialized before sending the web request to the server in the second request stage, which will make it take a long time to send the web request and increase the elapsed time of the second request stage.

The situation where the target elapsed time information fails to meet the elapsed time qualification condition corresponding to the second request stage may include one or more of the above situations. Specific cases of the target elapsed time information failing to meet the elapsed time qualification condition corresponding to the second request stage are in correspondence with the above cases of the target elapsed time information.

For the case where the target stage is the Receiving Stage (C), the target elapsed time information includes the following cases:

(c1) A third elapsed time duration of the receiving stage;

(c2) A first interface elapsed time duration, the first interface elapsed time duration being determined according to the third elapsed time duration and a second interface elapsed time duration which is obtained from a server;

Optionally, the first interface elapsed time duration is the difference between the third elapsed time duration and the second interface elapsed time duration which is obtained from the server, in which the second interface elapsed time duration is a time duration from the server receiving the web request to the server sending the web data stream corresponding to the web request.

The elapsed time of the receiving stage depends on the elapsed time of the web request interface (that is, the first interface elapsed time duration), so the first interface elapsed time duration can be used as a basis for evaluating whether this stage is too time-consuming or not.

(c3) The third elapsed time duration, and the first interface elapsed time duration.

Accordingly, the case where the target elapsed time information fails to meet the elapsed time qualification condition corresponding to the target stage, includes at least one of the following situations:

(C1) The third elapsed time duration is greater than or equal to a third preset duration;

Accordingly, the elapsed time qualification condition in this situation is that the elapsed time duration of the receiving stage is less than the third preset duration.

(C2) The first interface elapsed time duration is greater than or equal to a preset interface elapsed time duration.

Accordingly, the elapsed time qualification condition in this situation is that the first interface elapsed time duration in the receiving stage is less than the preset interface elapsed time duration.

The third preset duration and the preset interface elapsed time duration may be set according to actual application situations, such as service types, web scenarios, etc., without being limited in the embodiment of the present disclosure.

The target elapsed time information failing to meet the elapsed time qualification condition corresponding to the receiving stage can include one or more of the above situations. Specific cases of the target elapsed time information failing to meet the elapsed time qualification condition corresponding to the receiving stage are in correspondence with the above cases of the target elapsed time information.

For the case where the target stage is the Parsing Stage (D), the target elapsed time information includes the following cases:

(d1) A fourth elapsed time duration of the parsing stage;

(d2) A loading mode of the web data stream, the loading mode including: loading the web data stream after parsing of the web data stream is completed, or loading the web data stream while parsing the web data stream;

(d3) The fourth elapsed time duration of the parsing stage, and the loading mode of the web data stream.

Accordingly, the case where the target elapsed time information fails to meet the elapsed time qualification condition corresponding to the target stage, includes at least one of the following situations:

(D1) The fourth elapsed time duration is greater than or equal to a fourth preset duration;

In this situation, the elapsed time qualification condition is that the elapsed time duration of the parsing stage is less than the fourth preset duration;

(D2) The loading mode of the web data stream is loading the web data stream while parsing the web data stream.

In this case, the elapsed time qualification condition is that the loading mode of the web data stream in the parsing stage is loading the web data stream after parsing of the web data stream is completed.

The fourth preset duration may be set according to actual application situations, such as service types, parsing modes, etc., without being limited in the embodiment of the present disclosure.

The case where the target elapsed time information fails to meet the elapsed time qualification condition corresponding to the parsing stage may include one or more of the above situations. Specific cases of the target elapsed time information failing to meet the elapsed time qualification condition corresponding to the parsing stage are in correspondence with the above cases of the target elapsed time information.

For the case where the target stage is the Page Rendering Stage (E), the target elapsed time information includes the following cases:

(e1) A fifth elapsed time duration of the page rendering stage;

(e2) A loading mode of view information corresponding to the web data stream;

The loading mode includes: preloading or not preloading; the view information corresponding to the web data stream may include an XML file, and/or a viewholder mode, etc. The viewholder mode is a design method, which can quickly set values when scrolling a listview without having to re-create many objects every time, thus improving performance. Listview is a very important component in Android development, and it shows the specific content adaptively according to the length of data in the form of a list. The user can freely define the layout of each column of the listview. However, when there is a large amount of data to be loaded in the listview, it will occupy a lot of memory and affect performance. In this case, it is necessary to fill on demand by the viewholder mode and reuse some view frames, so as to reduce the creation of objects.

In the page rendering stage, the view information corresponding to the web data stream needs to be obtained first, so the view information corresponding to the web data stream needs to be loaded. In the case of not preloading the view information corresponding to the web data stream, it will take some time to load the view information corresponding to the web data stream in the page rendering stage, which may increase the elapsed time duration of the page rendering stage.

(e3) The fifth elapsed time duration of the page rendering stage, and the loading mode of the view information corresponding to the web data stream.

Accordingly, the case where the target elapsed time information fails to meet the elapsed time qualification condition corresponding to the target stage, includes at least one of the following situations:

(E1) The fifth elapsed time duration is greater than or equal to a fifth preset duration;

In this case, the elapsed time qualification condition is that the elapsed time duration of the page rendering stage is less than the fifth preset duration;

(E2) The loading mode of the view information corresponding to the web data stream is not preloading.

In this case, the elapsed time qualification condition is that the loading mode of view information corresponding to the web data stream is preloading.

The fifth preset duration can be set according to actual application situations, such as the latency requirement for page rendering, etc., without being limited in the embodiment of the present disclosure.

The case where the target elapsed time information fails to meet the elapsed time qualification condition corresponding to the page rendering stage may include one or more of the above situations. Specific cases of the target elapsed time information failing to meet the elapsed time qualification condition corresponding to the page rendering stage are in correspondence with the above cases of the target elapsed time information.

203: Optimizing the target stage in a subsequent process of refreshing the first page.

Through the methods shown in steps 201 and 202 above, the process of page refreshing can be divided into multiple stages, and by obtaining stage-specific target elapsed time information and adopting the elapsed time qualification condition for the corresponding stage, it is determined whether the target stage needs to be optimized due to excessive time consumption. Therefore, the target stage can be optimized in the subsequent process of refreshing the first page, so as to reduce the elapsed time duration of the subsequent process of refreshing the first page.

For the above-mentioned different stages, the corresponding optimization methods may be the same or different. Hereinafter, the optimization schemes of several stages are introduced in an exemplary way:

An optional optimization implementation is: optimizing the First Request Stage (A) and/or the Page Rendering Stage (E).

Figure 5:
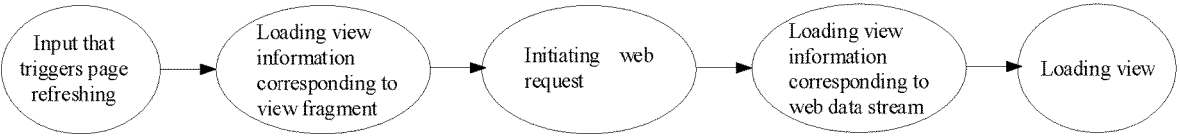
FIG. 5 is a schematic diagram of a serial execution mode of a page refreshing process provided by an embodiment of the present disclosure.
Figure 6:
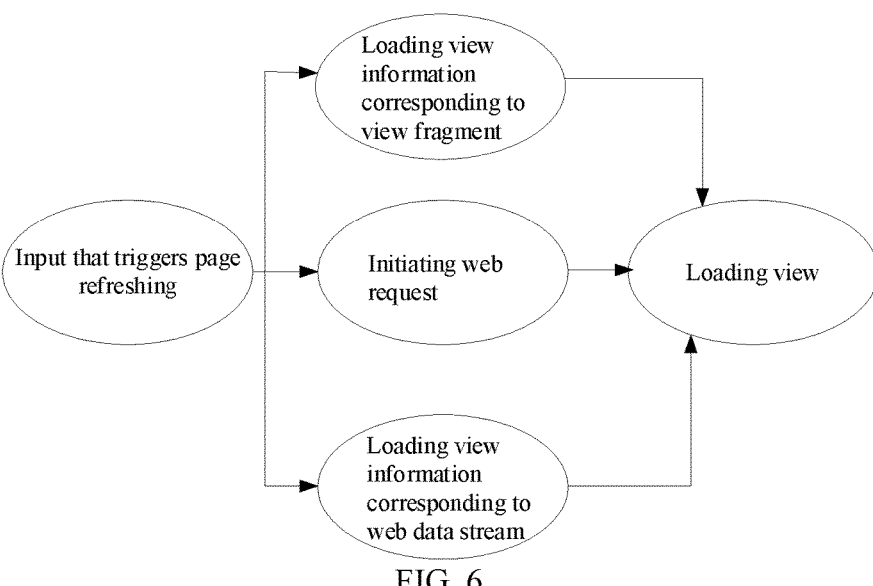
FIG. 6 is a schematic diagram of a parallel execution mode of a page refreshing process provided by an embodiment of the present disclosure.

In the flow of the current page refreshing process, as shown in FIG. 5, which is a schematic diagram of a serial execution mode of a page refreshing process, in the onCreate( ) callback function method, after the terminal device receives the input that triggers page refreshing, the view information corresponding to the view fragment is firstly loaded, then the web request is executed, and then the view information corresponding to the web data stream is loaded after the web request is successful realized. These operations are often performed serially. But in fact, there is no strict sequential relationship between these operations. Because the time consumption of the page refreshing process will be prolonged during serial execution, a parallel execution scheme is provided in the present disclosure, as shown in FIG. 6, which is a schematic diagram of a parallel execution mode of a page refreshing process.

After receiving the input that triggers refreshing the first page, the terminal device can execute at least two selected from the group consisting of the following operations 1), 2) and 3) in parallel:

1) Preloading the view information corresponding to the view fragment;

2) Initiating the web request;

3) Preloading the view information corresponding to the web data stream.

In FIG. 6, after the terminal device receives the input that triggers page refreshing, the three time-consuming operations are executed in parallel, that is, the above operations 1), 2) and 3) are executed in parallel, so that the total elapsed time length is optimally shortened from the sum of the elapsed time durations of the three operations 1), 2) and 3) to the maximum elapsed time duration among the elapsed time durations respectively of the three operations 1), 2) and 3). For example, assuming that the operation 2) has the maximum elapsed time duration, it only needs to refresh the web data stream into the viewholder view that has been preloaded in advance at the time the web request callback is successfully realized, so that the view can be loaded quickly.

For the above optimization implementation, the parallel implementation mode has a good optimization effect on both the first request stage and the page rendering stage, effectively shortening the durations of the first request stage and the page rendering stage.

An optional optimization implementation is: optimizing the Second Request Stage(B) and/or the Receiving Stage (E), which is realized by reducing the amount of data in the web request.

In the subsequent process of refreshing the first page, the web request can be sent after deleting a target interface field in a data interface in the web request.

The target interface field is a discarded interface field.

Usually in the updating process of the application program, the data interfaces in some pages are no longer used; if they are not deleted, these discarded interface fields will still be requested from the server. In the above optimization implementation, after deleting the discarded interface field, the amount of data requested from the server can be reduced, thus reducing the time consumption of the web request process.

An optional optimization implementation is: optimizing the Second Request Stage (B). In the second request stage, before the web request module sends the web request, the web request module needs to be initialized. Therefore, in the case where the web request module is not initialized before the second request stage, the web request module needs to be initialized in the second request stage before sending the web request to the server, which will make it time-consuming to send the web request and increase the elapsed time duration of the second request stage. Therefore, in the embodiment of the present disclosure, the web request module can be pre-initialized before the second request stage.

An optional optimization implementation is: optimizing the Receiving Stage (C). For a page refreshing process, a plurality of web requests are needed to request the corresponding web data stream, which will lead to too much time consumption in the web request process in the case where the corresponding request interfaces configured for the plurality of web requests are executed serially. Therefore, the terminal device can configure the request interfaces corresponding to the plurality of web requests to execute in parallel, which can save the time consumption of the web requests.

An optional optimization implementation is: optimizing the Parsing Stage (D).

At present, in the case where the terminal device loads the web data stream obtained by request and the previous loading mode of the web data stream is the mode of loading the web data stream after parsing of the web data stream is completed, it is time-consuming to load the view information corresponding to the web data stream. Therefore, in the present disclosure, in the process of parsing the web data stream, a mode of loading the web data stream while parsing the web data stream is provided to load the view information corresponding to the web data stream.

A first mode of loading the web data stream while parsing the web data stream is:

through the mode of loading the web data stream while parsing the web data stream, in the process of parsing the web data stream, after parsing to obtain first screen data, loading the view information corresponding to the first screen data, and synchronously parsing first remaining data in the web data stream, in which the first screen data is data displayed in a screen for a first time in data of the first page.

The first remaining data is data other than the first screen data in the web data stream.

Figure 7:
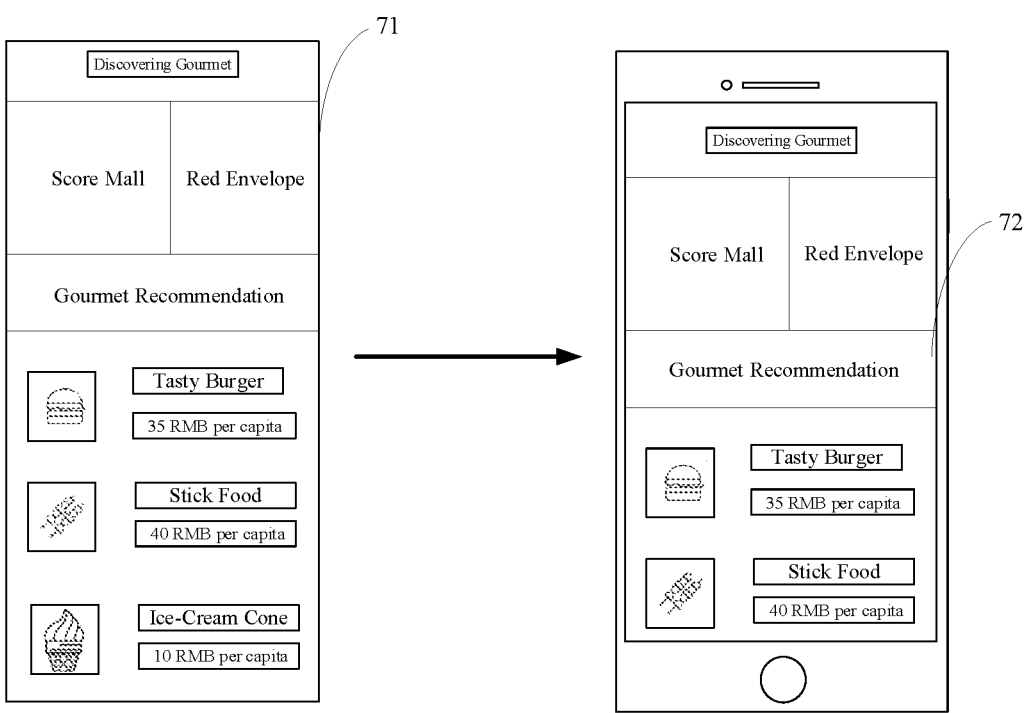
FIG. 7 is a schematic diagram of displaying only the first screen data provided by an embodiment of the present disclosure.

Illustratively, as shown in FIG. 7, it is a schematic diagram displaying only the first screen data. FIG. 7 shows the data 71 of the first page, that is, the data that needs to be obtained when refreshing the first page. However, the terminal device does not display the data 71 in its entirety within the display range of the screen, but rather displays part of the data 71. After the first page is actually refreshed, the first screen data 72 is displayed on the screen of the terminal device as shown in FIG. 7, and the first screen data 72 is part of the data 71.

The second mode of loading the web data stream while parsing the web data stream is:

through the mode of loading the web data stream while parsing the web data stream, in the process of parsing the web data stream, after obtaining placeholder data, loading placeholder view information corresponding to the placeholder data, and synchronously parsing second remaining data in the web data stream, in which the placeholder data is a view frame used for displaying an element in a view in the first screen data.

The second remaining data is data other than the placeholder data in the web data stream.

Figure 8:
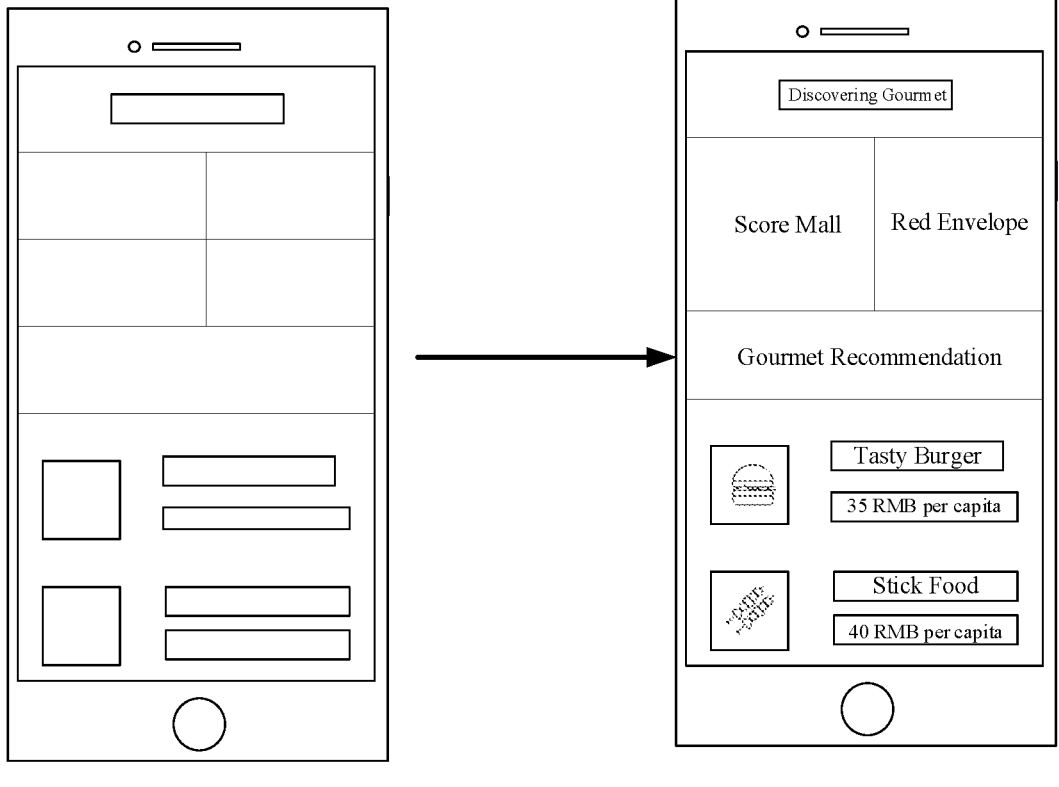
FIG. 8 is a schematic diagram of displaying placeholder view information in the first screen data provided by an embodiment of the present disclosure.

Illustratively, as shown in FIG. 8, which is a schematic diagram of displaying placeholder view information in the first screen data, the placeholder view information in the first screen data of the first page can be firstly displayed. This display method is similar to the implementation of skeleton screen, in both of which the view frame in the page is firstly displayed, so that the general outline of the page can be displayed on the screen, as shown in a of FIG. 8. After the elements (which can refer to the contents of the data) in the page are subsequently parsed, these elements are further displayed in the view frame, as shown in b of FIG. 8.

Compared with the step of loading the view after completely parsing the contents of the first page included in the web data stream, the above two modes of loading the web data stream while parsing the web data stream can give priority to loading more important contents for display, which can shorten the elapsed time duration of the parsing stage.

The elapsed time optimization method for page refreshing provided by the embodiment of the disclosure includes: obtaining target elapsed time information of a target stage in a process of refreshing a first page; determining that the target stage is to be optimized, in response to the target elapsed time information failing to meet an elapsed time qualification condition corresponding to the target stage; and optimizing the target stage in a subsequent process of refreshing the first page. By obtaining the target elapsed time information of the target stage in the process of refreshing the first page, it can be judged whether the target elapsed time information meets the elapsed time qualification condition. When it is determined that the target elapsed time information meets the elapsed time qualification condition corresponding to the target stage, it is considered that there is no problem of excessive time consumption in this stage; and when it is determined that the target elapsed time information fails to meet the elapsed time qualification condition corresponding to the target stage, it is considered that there is the problem of excessive time consumption in the target stage and the target stage needs to be optimized. In this way, the target stage that is too time-consuming can be located in the process of refreshing the page, and in the subsequent process of refreshing the first page, targeted optimization can be performed on the target stage.

Figure 9:
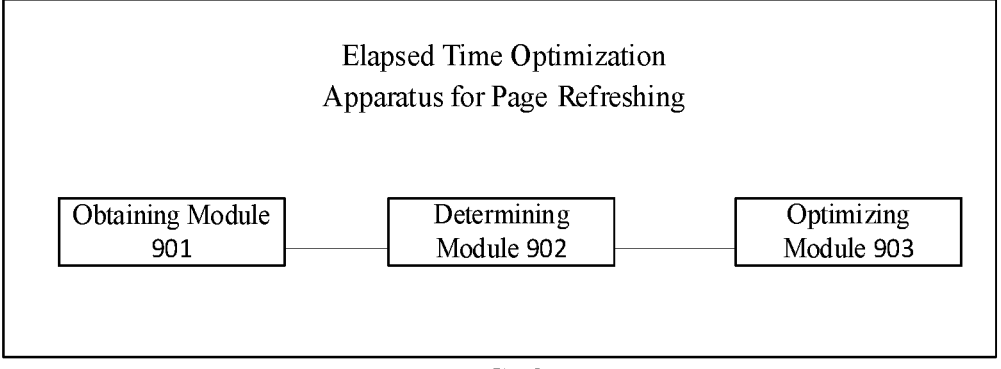
FIG. 9 is a schematic structural diagram of an elapsed time optimization apparatus for page refreshing provided by an embodiment of the present disclosure.

As shown in FIG. 9, which is a schematic structural diagram of an elapsed time optimization apparatus for page refreshing provided by an embodiment of the present disclosure, and the apparatus includes:

an obtaining module 901, configured to obtain target elapsed time information of a target stage in a process of refreshing a first page;

a determining module 902, configured to determine that the target stage is to be optimized, in response to the target elapsed time information failing to meet an elapsed time qualification condition corresponding to the target stage;

an optimizing module 903, configured to optimize the target stage in a subsequent process of refreshing the first page.

As an optional implementation of the embodiment of the present disclosure, the process of refreshing the first page includes a plurality of stages, and the target stage is at least one of the plurality of stages.

As an optional implementation of the embodiment of the present disclosure, the target stage includes at least one of the following stages:

a first request stage, a second request stage, a receiving stage, a parsing stage and a page rendering stage;

the first request stage is from receiving an input that triggers refreshing the first page to a client initiating a web request; the second request stage is from the client initiating the web request to a web request module initiating the web request; the receiving stage is from the client initiating the web request to receiving a web data stream; the parsing stage is from receiving the web data stream to completing parsing of the web data stream; the page rendering stage is from completing parsing of the web data stream to completing page rendering.

As an optional implementation of the embodiment of the present disclosure, the target stage is the first request stage, the target elapsed time information includes at least one of the following:

a first elapsed time duration;

a view layer in which a first view fragment initiating the web request is located;

a loading mode of view information corresponding to a view fragment, the loading mode including: preloading the view information or not preloading the view information;

the case where the target elapsed time information fails to meet the elapsed time qualification condition corresponding to the target stage, includes at least one of the following situations:

the first elapsed time duration is greater than or equal to a first preset duration;

the view layer in which the first view fragment is located is not an outermost layer;

the loading mode of the view information corresponding to the view fragment is not preloading.

As an optional implementation of the embodiment of the present disclosure, the target stage is the second request stage, the target elapsed time information includes at least one of the following:

a second elapsed time duration;

an initialization state of the web request module, the initialization state including the case that initialization has been performed before the second request stage, or the case that initialization has not been performed before the second request stage;

the case where the target elapsed time information fails to meet the elapsed time qualification condition corresponding to the target stage, includes at least one of the following situations:

the second elapsed time duration is greater than or equal to a second preset duration;

the initialization state of the web request module is the case that initialization has not been performed before the second request stage.

As an optional implementation of the embodiment of the present disclosure, the target stage is the receiving stage, the target elapsed time information includes at least one of the following:

a third elapsed time duration;

a first interface elapsed time duration, the first interface elapsed time duration being determined according to the third elapsed time duration and a second interface elapsed time duration which is obtained from a server, the second interface elapsed time duration being a time duration from the server receiving the web request to the server sending the web data stream corresponding to the web request;

the case where the target elapsed time information fails to meet the elapsed time qualification condition corresponding to the target stage, includes at least one of the following situations:

the third elapsed time duration is greater than or equal to a third preset duration;

the first interface elapsed time duration is greater than or equal to a preset interface elapsed time duration.

As an optional implementation of the embodiment of the present disclosure, the target stage is the parsing stage, the target elapsed time information includes at least one of the following:

a fourth elapsed time duration;

a loading mode of the web data stream, the loading mode including: loading after parsing is completed, or loading while parsing;

the case where the target elapsed time information fails to meet the elapsed time qualification condition corresponding to the target stage, includes at least one of the following situations:

the fourth elapsed time duration is greater than or equal to a fourth preset duration;

the loading mode of the web data stream is loading the web data stream while parsing the web data stream.

As an optional implementation of the embodiment of the present disclosure, the target stage is the page rendering stage, the target elapsed time information includes at least one of the following:

a fifth elapsed time duration;

a loading mode of view information corresponding to the web data stream, the loading mode including: preloading the view information or not preloading the view information;

the case where the target elapsed time information fails to meet the elapsed time qualification condition corresponding to the target stage, includes at least one of the following:

the fifth elapsed time duration is greater than or equal to a fifth preset duration;

the loading mode of the view information corresponding to the web data stream is not preloading the view information.

As an optional implementation of the embodiment of the present disclosure, the target stage includes: the first request stage and/or the page rendering stage;

the optimizing module 903 is specifically configured to perform, after receiving the input that triggers refreshing the first page, at least two of the following operations in parallel:

preloading view information corresponding to a view fragment;

initiating the web request;

preloading view information corresponding to the web data stream.

As an optional implementation of the embodiment of the present disclosure, the target stage includes: the second request stage and/or the receiving stage;

the optimizing module 903 is specifically configured to send the web request after deleting a target interface field in a data interface in the web request, in which the target interface field is a discarded interface field.

As an optional implementation of the embodiment of the present disclosure, the target stage includes: the second request stage;

the optimizing module 903 is specifically configured to initialize the web request module before the second request stage.

As an optional implementation of the embodiment of the present disclosure, the target stage includes: the receiving stage;

the optimizing module 903 is specifically configured to configure request interfaces corresponding to a plurality of web requests to execute in parallel.

As an optional implementation of the embodiment of the present disclosure, the target stage includes: the parsing stage;

the optimizing module 903 is specifically configured to load view information corresponding to the web data stream in a process of parsing the web data stream through a mode of loading the view information while parsing the view information.

As an optional implementation of the embodiment of the present disclosure, the optimizing module 903 is specifically configured to:

through a mode of loading while parsing, in the process of parsing the web data stream, after parsing the web data stream to obtain first screen data, load the view information corresponding to the first screen data, and synchronously parse first remaining data in the web data stream, in which the first screen data is data displayed in a screen for a first time in data of the first page;

or, in the process of parsing the web data stream, after parsing the web data stream to obtain placeholder data, load placeholder view information corresponding to the placeholder data, and synchronously parse second remaining data in the web data stream, in which the placeholder data is a view frame used for displaying an element in a view in the first screen data.

Figure 10:
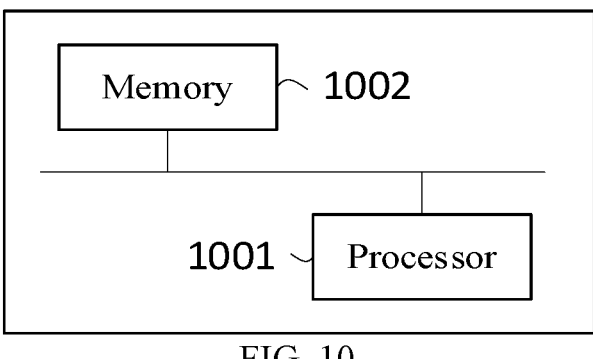
FIG. 10 is a schematic structural diagram of a terminal device provided by an embodiment of the present disclosure.

As shown in FIG. 10, at least one embodiment of the present disclosure further provides a terminal device, which includes: a processor 1001, a memory 1002, and a computer program stored in the memory 1002 and executable on the processor 1001. The computer program, when executed by the processor 1001, realizes the elapsed time optimization method for page refreshing in the above method embodiments.

An embodiment of the present disclosure provides a computer-readable storage medium, which is characterized in that a computer program is stored on the computer-readable storage medium, and the computer program, when executed by a processor, realizes each process of the elapsed time optimization method for page refreshing in the above method embodiments. And the same technical effect can be achieved, and in order to avoid repetition, the details will not be repeated here.

The computer-readable storage medium can be a Read-Only Memory (ROM), a Random Access Memory (RAM), a magnetic disk or an optical disk, etc.

An embodiment of the present disclosure provides a computer program product, which stores a computer program, and the computer program, when executed by a processor, realizes each process of the elapsed time optimization method for page refreshing in the above method embodiments. And the same technical effect can be achieved, and in order to avoid repetition, the details will not be repeated here.

It should be appreciated by those skilled in the art that, the embodiments of the present disclosure can be provided as a method, system, or computer program product. Accordingly, the present disclosure can take a form of an entire hardware embodiment, an entire software embodiment or an embodiment combining software and hardware aspects. Moreover, the present disclosure can take a form of a computer program product implemented on one or more computer-usable storage media having computer-usable program code embodied therein.

In the present disclosure, the processor can be a central processing unit (CPU), and can also be another general-purpose processor, a digital signal processor (DSP), an application specific integrated circuit (ASIC), a field-programmable gate array (FPGA) or other programmable logic devices, a discrete gate or transistor logic device, a discrete hardware component, etc. The general-purpose processor can be a microprocessor and can also be any conventional processor, or the like.

In the present disclosure, the memory can include a non-permanent memory, a random access memory (RAM), and/or non-volatile memory, etc., in a computer-readable medium, such as a read-only memory (ROM) or a flash memory (flash RAM). The memory is an example of the computer-readable medium.

In the present disclosure, the computer-readable medium includes permanent and non-permanent, removable and non-removable storage media. The storage medium can implement information storage by any method or technology, and information can be a computer-readable instruction, data structure, a module of a program, or other data. Examples of the storage medium of a computer include, but are not limited to, a phase-change random access memory (PRAM), a static random access memory (SRAM), a dynamic random access memory (DRAM), other types of random access memory (RAM), a read-only memory (ROM), an electrically erasable programmable read-only memory (EE-PROM), a flash memory or other memory technology, a compact disc read-only memory (CD-ROM), a digital versatile disks (DVD) or other optical storage, a magnetic cassette, a magnetic disk storage or other magnetic storage device, or any other non-transmission medium, which can be used for storing information that can be accessed by the computing device. As defined herein, the computer-readable medium does not include computer readable transitory media such as modulated data signals and carrier wave.

It should be noted that in this paper, relational terms such as "first" and "second" are only used to distinguish one entity or operation from another entity or operation, and do not necessarily require or imply any such actual relationship or order between these entities or operations. Moreover, the terms "including", "including" or any other variation thereof are intended to cover non-exclusive inclusion, so that a process, method, article or equipment including a series of elements includes not only those elements, but also other elements not explicitly listed or elements inherent to such process, method, article or equipment. Without more restrictions, the element defined by the phrase "including one . . . " does not exclude that there are other identical elements in the process, method, article or equipment including the element.

The above are only specific embodiments of the present disclosure, so that those skilled in the art can understand or realize the present disclosure. Many modifications to these embodiments will be obvious to those skilled in the art, and the general principles defined herein can be implemented in other embodiments without departing from the spirit or scope of this disclosure. Therefore, this disclosure will not be limited to these embodiments herein, but is to be accorded the widest scope consistent with the principles and novel features disclosed herein.

The invention claimed is:

1. An elapsed time optimization method for page refreshing, characterized by comprising:

obtaining target elapsed time information of a target stage in a process of refreshing a first page;

in response to determining that the target elapsed time information fails to meet an elapsed time qualification condition corresponding to the target stage, the target stage is to be optimized; and optimizing the target stage in a subsequent process of refreshing the first page;

wherein the target stage comprises at least one of the following stages:

a first request stage, a second request stage, a receiving stage, a parsing stage and a page rendering stage;

wherein the first request stage is from receiving an input that triggers refreshing the first page to a client initiating a web request; the second request stage is from the client initiating the web request to a web request module initiating the web request; the receiving stage is from the client initiating the web request to receiving a web data stream; the parsing stage is from receiving the web data stream to completing parsing of the web data stream; the page rendering stage is from completing parsing of the web data stream to completing page rendering.

2. The method according to claim 1, characterized in that the process of refreshing the first page comprises a plurality of stages, and the target stage is at least one of the plurality of stages.

3. The method according to claim 1, characterized in that the target stage is the first request stage, the target elapsed time information comprises at least one of the following:

a first elapsed time duration;

a view layer in which a first view fragment initiating the web request is located;

a loading mode of view information corresponding to a view fragment, the loading mode comprising: preloading or not preloading; and the target elapsed time information failing to meet the elapsed time qualification condition corresponding to the target stage, comprises at least one of the following:

the first elapsed time duration being greater than or equal to a first preset duration;

the view layer in which the first view fragment is located not being an outermost layer;

the loading mode of the view information corresponding to the view fragment being not preloading.

4. The method according to claim 1, characterized in that the target stage is the second request stage, the target elapsed time information comprises at least one of the following:

a second elapsed time duration;

an initialization state of the web request module, the initialization state comprising: a state that initialization has been performed before the second request stage, or, a state that initialization has not been performed before the second request stage;

the target elapsed time information failing to meet the elapsed time qualification condition corresponding to the target stage, comprises at least one of the following:

the second elapsed time duration being greater than or equal to a second preset duration;

the initialization state of the web request module being that initialization has not been performed before the second request stage.

5. The method according to claim 1, characterized in that the target stage is the receiving stage, the target elapsed time information comprises at least one of the following:

a third elapsed time duration;

a first interface elapsed time duration, the first interface elapsed time duration being determined according to the third elapsed time duration and a second interface elapsed time duration obtained from a server, the second interface elapsed time duration being a time duration from the server receiving the web request to the server sending the web data stream corresponding to the web request;

the target elapsed time information failing to meet the elapsed time qualification condition corresponding to the target stage, comprises at least one of the following:

the third elapsed time duration being greater than or equal to a third preset duration;

the first interface elapsed time duration being greater than or equal to a preset interface elapsed time duration.

6. The method according to claim 1, characterized in that the target stage is the parsing stage, the target elapsed time information comprises at least one of the following:

a fourth elapsed time duration;

a loading mode of the web data stream, the loading mode comprising: loading after parsing is completed, or loading while parsing;

the target elapsed time information failing to meet the elapsed time qualification condition corresponding to the target stage, comprises at least one of the following:

the fourth elapsed time duration being greater than or equal to a fourth preset duration;

the loading mode of the web data stream is loading while parsing.

7. The method according to claim 1, characterized in that the target stage is the page rendering stage, the target elapsed time information comprises at least one of the following:

a fifth elapsed time duration;

a loading mode of view information corresponding to the web data stream, the loading mode comprising: preloading or not preloading;

the target elapsed time information failing to meet the elapsed time qualification condition corresponding to the target stage, comprises at least one of the following:

the fifth elapsed time duration being greater than or equal to a fifth preset duration;

the loading mode of the view information corresponding to the web data stream being not preloading.

8. The method according to claim 1, characterized in that the target stage comprises: the first request stage and/or the page rendering stage;

the optimizing the target stage comprises: performing at least two of the following in parallel when refreshing the first page:

preloading view information corresponding to a view fragment;

initiating the web request;

preloading view information corresponding to the web data stream.

9. The method according to claim 1, characterized in that the target stage comprises: the second request stage and/or the receiving stage;

the optimizing the target stage comprises:

sending the web request after deleting a target interface field in a data interface in the web request, wherein the target interface field is a discarded interface field.

10. The method according to claim 1, characterized in that the target stage comprises: the second request stage;

the optimizing the target stage comprises:

initializing the web request module before the second request stage.

11. The method according to claim 1, characterized in that the target stage comprises: the receiving stage;

the optimizing the target stage comprises:

configuring request interfaces corresponding to a plurality of web requests to execute in parallel.

12. The method according to claim 1, characterized in that the target stage comprises: the parsing stage;

the optimizing the target stage comprises:

loading view information corresponding to the web data stream in a process of parsing the web data stream through a mode of loading while parsing.

13. The method according to claim 12, characterized in that the loading the view information corresponding to the web data stream in the process of parsing the web data stream through the mode of loading while parsing comprises:

in the process of parsing the web data stream, after parsing the web data stream to obtain first screen data, loading view information corresponding to the first screen data, and synchronously parsing first remaining data in the web data stream, wherein the first screen data is data displayed in a screen for a first time in data of the first page; or, in the process of parsing the web data stream, after parsing the web data stream to obtain placeholder data, loading placeholder view information corresponding to the placeholder data, and synchronously parsing second remaining data in the web data stream, wherein the placeholder data is a view frame used for displaying an element in a view in the first screen data.

14. A terminal device, characterized by comprising: a processor, a memory and a computer program stored in the memory and executable on the processor, wherein the computer program, when executed by the processor, realizes the elapsed time optimization method for page refreshing according to claim 1.

15. A computer-readable storage medium, characterized in that a computer program is stored on the computer-readable storage medium, and the computer program, when executed by a processor, realizes the elapsed time optimization method for page refreshing according to claim 1.

16. A computer program product, characterized in that the computer program product, when run on a computer, causes the computer to realize the elapsed time optimization method for page refreshing according to claim 1.

* * * * *